(12) United States Patent
Marduel

(10) Patent No.: US 8,967,079 B2
(45) Date of Patent: Mar. 3, 2015

(54) DEVICE AND METHOD FOR IMPREGNATING A POROUS MATERIAL WITH POWDER

(75) Inventor: Joric Marduel, Chazay D'Azergues (FR)

(73) Assignee: Fibroline France, Ecully (FR)

( * ) Notice: Subject to any disclaimer, the term of this patent is extended or adjusted under 35 U.S.C. 154(b) by 976 days.

(21) Appl. No.: 13/002,244

(22) PCT Filed: Jun. 19, 2009

(86) PCT No.: PCT/FR2009/051174
§ 371 (c)(1),
(2), (4) Date: Dec. 30, 2010

(87) PCT Pub. No.: WO2010/001043
PCT Pub. Date: Jan. 7, 2010

(65) Prior Publication Data
US 2011/0097505 A1      Apr. 28, 2011

(30) Foreign Application Priority Data

Jul. 2, 2008    (FR) ...................................... 08 54503

(51) Int. Cl.
*B05C 5/00*    (2006.01)
*H01F 41/00*   (2006.01)
*B29B 15/12*   (2006.01)

(52) U.S. Cl.
CPC ..................................... *B29B 15/12* (2013.01)
USPC ......................................... 118/620; 427/457

(58) Field of Classification Search
USPC .......................................................... 347/55
See application file for complete search history.

(56) References Cited

U.S. PATENT DOCUMENTS 2,328,577 A * 9/1943 Oglesby .......................... 51/295
2,473,251 A   6/1949 Hsu
(Continued)

FOREIGN PATENT DOCUMENTS

BE  488310 A   4/1949
EP  1525969 A1 4/2005
(Continued)

OTHER PUBLICATIONS

Maxfield, Clive. Bebop to the Boolean Boogie: An Unconventional Guide to Electronics (Chapter 18). 3rd ed. Oxford: Elsevier, 2009.*
European Patent Office, International Search Report for International Application No. PCT/FR2009/051174, dated Oct. 12, 2009, (3 pgs).
(Continued)

*Primary Examiner* — Dah-Wei D Yuan
*Assistant Examiner* — Charles Capozzi
(74) *Attorney, Agent, or Firm* — Heslin Rothenberg Farley & Mesiti P.C.; George S. Blasiak, Esq.

(57) ABSTRACT

This impregnation device comprises at least a first dielectric insulating screen and first and second opposite-facing electrodes which are separated by a passage for the porous material to be impregnated provided with powder and are capable of producing an alternating electric field in this passage after having been connected to an alternating voltage generator. At least first electrode comprises at least two conducting strips, each of which has an internal face covered by the first dielectric screen and, overall, is turned towards the second electrode and also a longitudinal edge running along a separating slot, which strips are separated from each other by this separating slot and are electrically connected to one another.

17 Claims, 2 Drawing Sheets

(56) References Cited

U.S. PATENT DOCUMENTS 5,374,949 A * 12/1994 Wada et al. .................. 347/112
5,600,355 A *  2/1997 Wada ............................ 347/55
2006/0233966 A1* 10/2006 Marduel ....................... 427/475

FOREIGN PATENT DOCUMENTS

EP             1526214 A1    4/2005
WO       WO-9922920 A1      5/1999
WO    WO-2007110524 A1     10/2007

* cited by examiner

DEVICE AND METHOD FOR IMPREGNATING A POROUS MATERIAL WITH POWDER

CROSS REFERENCE TO RELATED APPLICATIONS

This application is a National Stage application under 35 U.S.C. §371 of PCT Application No. PCT/FR2009/051174, filed Jun. 19, 2009, which claims priority to French Application No. FR 0854503, filed Jul. 2, 2008, entitled "Device And Method For Impregnating A Porous Material With Powder."

FIELD OF THE INVENTION

The present invention relates to the field of impregnating using an alternating electric field. More precisely, it relates to a method and device for impregnating a porous material, such as a fibrous web, with powder.

Impregnating a fibrous or filamentous web with powder can be a stage in the manufacture of a composite material having a matrix that is produced by subsequent fusion, or some other transformation of this powder, in the fibres or filaments of the web. Impregnating a fibrous web in order to produce a composite material is therefore an example of one application of the invention.

It is possible to envisage many other applications of the invention. For example, the invention can be used during the manufacture of a bentonite geotextile in order to make a clay-based powder penetrate into a textile structure. Another example of an application of the invention is to incorporate anti-bacterial, fire-suppressant, super absorbent or other active ingredients into a porous web in the form of a dry powder or a mix of powders. Another example of an application of the invention is to incorporate a powder binder into a fibrous web before melting and then hardening this binder so that it joins the fibres over at least part of the thickness of the web, with the final product thus obtained possibly being a textile covering such as a carpet in particular.

DESCRIPTION OF THE PRIOR ART

International Patent Application WO 99/22920 describes a method for impregnating a fibrous or filamentous web with a powder, particularly in order to produce a composite material. Using this method, both the powder and the web of fibres or filaments are subjected to an alternating electric field which is produced between two electrodes that are connected to a single voltage generator. Each electrode is in the form of a metal plate. Dielectric plates are provided in order to prevent electric arcing between the electrodes. It has been found that, especially when operating with high electric field levels between the electrodes, the dielectric plates tend to age rapidly to the point where they are no longer capable of fulfilling their insulating function, hence causing breakdown which results in electric arcing through at least one of the dielectric plates.

European Patent Application EP-1 526 214 proposes a different way of creating the electric field that is intended to cause the powder to penetrate into a fibrous or filamentous web. More precisely, this field is generated between two rows of electrode tubes, each of which comprises a tubular insulator, made of quartz or some other dielectric, as well as a conducting layer that covers one inside face of this insulator. Using such electrode tubes makes it possible to impregnate webs having large dimensions, especially wide strips that are continuously treated by moving them between the two rows of electrode tubes. However, each electrode tube is extremely expensive and this is a major drawback of the solution that is proposed in European Patent Application EP-1 526 214.

The object of the invention is to at least improve, as economically as possible, the service life of an impregnation device by using an alternating electric field.

SUMMARY OF THE INVENTION

According to the invention, this object is achieved by a device for impregnating a porous material with powder comprising at least a first dielectric insulating screen and first and second opposite-facing electrodes which are separated by a passage for the porous material provided with powder and are capable of producing an alternating electric field in this passage after having been connected to an alternating voltage generator. The first dielectric screen electrically insulates the first and second electrodes from each other at the level of said passage. At least the first electrode comprises at least two conducting strips, each of which has an internal face covered by the first dielectric screen and, overall, is turned towards the second electrode and also a longitudinal edge running along a separating slot, which strips are separated from each other by this separating slot and are electrically connected to one another.

It has been found that, if one or both of the electrodes that produce the alternating electric field is/are discontinuous and appropriately subdivided into successive strips, the dielectric screen that covers its internal face is much less prone to ageing, to the extent that no breakdown through this dielectric screen takes place, even after prolonged operation with high alternating electric field values. It has also been observed that the temperature rise of the electrode, when appropriately divided up into successive strips, was less than in the case of a continuous electrode that covers the same surface as all the successive strips. It is thought that the smaller temperature rise on an electrode that is divided up into strips explains why the dielectric screen is more resistant over time, because this reduces the thermal stresses to which the screen is subjected when the device is operating.

Advantageously, the impregnation device comprises a unit for transporting the porous material through said passage in a direction in which there are successive conducting strips of the first electrode.

Advantageously, the first dielectric screen forms a support for the conducting strips of the first electrode.

Advantageously, the device comprises a second dielectric screen which electrically insulates the first and second electrodes from each other at the level of said passage, the second electrode comprising at least two conducting strips, each of which has an internal face covered by the second dielectric screen and, overall, is turned towards the first electrode and also a longitudinal edge running along a separating slot, which strips are separated from each other by this separating slot and are electrically connected to one another.

The object of the invention is also a method for impregnating a porous material with powder in which both the porous material and the powder are subjected to an alternating electric field produced by the first and second opposite-facing electrodes with at least a first dielectric screen electrically insulating the first and second electrodes from each other between these first and second electrodes. At least the first electrode comprises at least two conducting strips, each of which has an internal face covered by the first dielectric screen and, overall, is turned towards the second electrode and also a longitudinal edge running along a separating slot, which strips are separated from each other by this separating slot and are electrically connected to one another.

Advantageously, this method is implemented by using a device as defined above.

BRIEF DESCRIPTION OF THE DRAWINGS

The invention will be made more readily understandable by the following description which is given merely by way of example and relates to the accompanying drawings in which.

DESCRIPTION OF THE PREFERRED EMBODIMENTS

Figure 1:
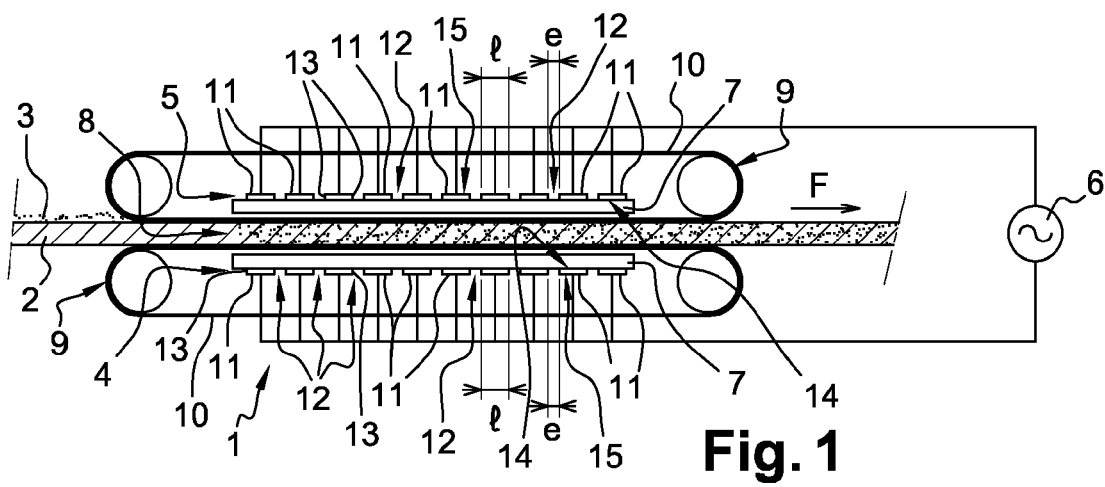
FIG. 1 is a diagram of an impregnation device in accordance with the invention in which a fibrous web, shown in longitudinal cross-section, is impregnated with powder.

FIG. 1 shows an impregnation device 1 through which a fibrous web 2 is gradually transported in the direction represented by arrow F and in which this fibrous web 2 is impregnated with powder 3.

Impregnation device 1 comprises a pair of opposite-facing electrodes, each of which is connected to one of two terminals of an alternating voltage source or generator 6 and which constitute lower electrode 4 and upper electrode 5. Each of these two electrodes 4 and 5 is supported by a plate that is made of a dielectric material and forms an insulating screen 7. Screens 7 are located between electrodes 4 and 5 so as to electrically insulate them from each other. Between them, they delimit a planar passage 8 for fibrous web 2.

In the example shown, a unit that transports fibrous web 2 through passage 8 in feed direction F comprises two belt conveyors 9 which are arranged one on top of each other so that they are substantially parallel to each other. Respective belts 10 of these two conveyors 9 pass through passage 8 parallel to each other and in the same direction F. Once fibrous web 2 has been gripped between these belts, together they can feed it through passage 8. In order to make it possible to transport fibrous webs 2 of different thicknesses, the vertical distance between conveyors 9 is adjustable in a manner which is known in itself.

Figure 2:
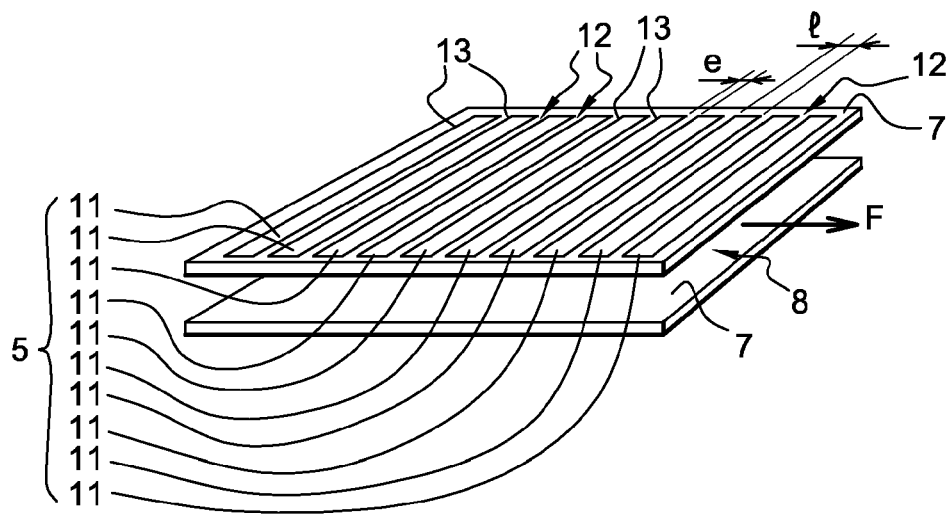
FIG. 2 is a schematic perspective view of a pair of opposite-facing subassemblies of the impregnation device shown in FIG. 1.

Each of electrodes 4 and 5 is discontinuous and consists of a row of successive conducting strips 11 that are separated from each other by slot-shaped discontinuities or gaps 12 where there is no conductive material. As can be seen in FIG. 2, strips 11 extend from the left-hand side to the right-hand side of passage 8 over the entire width of passage 8 and are not parallel to direction of travel F. Although they run alongside each other, conducting strips 11 of a single electrode 4 or 5 can have various shapes. In the example in FIGS. 1 and 2 they are straight and parallel to each other.

Each conducting strip 11 comprises two longitudinal edges 13 and two main opposite faces that longitudinal edges 13 link to each other and are an internal face 14 which, overall, is turned towards passage 8 and external face 15. Each slot 12 is delimited by two longitudinal edges 13, each of which is located on one of two successive strips 11. Each conducting strip 11 has a longitudinal edge 13 that runs alongside one of slots 12 which separates it from another conducting strip 11.

The width of slots 12, i.e. the spacing e between two consecutive conducting strips 11, is preferably greater than 20 mm. Spacing e is preferably less than 200 mm. The spacing is advantageously from 25 to 50 mm.

The width l of each conducting strip 11 is advantageously from 10 mm to 1000 mm and preferably from 20 mm to 100 mm.

In a design that produced good results, each conducting strip 11 had a width l of around 50 mm whereas slots 12 had a width e of around 25 mm.

Conducting strips 11 can be realised in various ways. For example, each conducting strip 11 can be in the form of a metal coating that is deposited locally on one of electrodes 7 by using a metallisation technique. Each conducting strip 11 can also consist of a layer of resin that is heavily loaded with metallic particles, such as a silver-conductive lacquer. In either case, there is no air gap between conducting strips 11 and their support. The absence of such air gaps means that, when the electric field is generated between the electrodes, no plasma is produced between a screen 7 and the conducting strips 11 that supports that screen 7. This is advantageous in terms of ability to withstand ageing.

Electrodes 4 and 5 are provided in order to generate an alternating electric field between the electrodes at the level of passage 8. To achieve this, the conducting strips 11 of one of the two electrodes 4 and 5 can be arranged in several ways relative to the conducting strips 11 of the other electrode. In the example in FIG. 1, each conducting strip 11 of lower electrode 4 faces a conducting strip 11 of upper electrode 5.

Dielectric screens 7 electrically insulate electrodes 4 and 5 from each other so as to prevent electric arcing between the two electrodes 4 and 5. To do this, they are arranged between electrodes 4 and 5, either side of passage 8. The dielectric material used to make screens 7 can, in particular, be glass.

It is possible to only cover one of the two electrodes 4 and 5 with a screen 7, especially if the chosen application allows the use of relatively low electric field levels. However, each electrode 4 or 5 is preferably provided with an insulating screen 7.

In FIG. 1, a fibrous web is impregnated with powder 3 which has previously been sprinkled on its upper face. Sprinkling generally takes place over the entire surface area of the web that is to be impregnated. However, in certain cases it is also possible to perform local sprinkling, for example by using a stencil. Also, at least some of powder 3 need not be deposited on top of fibrous web 2; it can be applied underneath fibrous web 2 before it passes between electrodes 4 and 5, for instance by depositing it on lower conveyor 9 after modifying it accordingly.

Powder 3 can consist of polymer particles intended to be melted in order to form, after cooling, the matrix of a composite material that is reinforced by the fibres of web 2 or to ensure the cohesion of a textile covering, such as a carpet, by joining the fibres of this textile covering, for instance at the level of a bonding zone which may comprise web 2 over part of its thickness and where the fibres are joined together and densely entangled. Powder 3 can be a pulverant material other than polymer particles designed to be melted once inside web 2. For instance, it can also be a bentonite clay or an active ingredient. The fibres of web 2 can also be in the form of a mat or be linked together by needle punching or in any other way. Also, the material that is intended to be impregnated with powder 3 need not be fibrous, as long as it is porous and capable of being impregnated.

Conveyors 9 bring fibrous web 2 and powder 3 together between electrodes 4 and 5, in passage 8, and transport them substantially continuously. At the level of passage 8, the alternating electric field generated by electrodes 4 and 5 causes powder 3 to penetrate into fibrous web 2. Because it is an alternating field, the field generated between electrodes 4 and 5 has a maximum value which is selected depending on the application, especially taking into account the distinctive features of web 2 and/or powder 3. Maximum field values from 0.10 to 20 kV/mm have proved suitable in numerous applications. Also, the power supply voltage of electrodes 4 and 5 can have various wave shapes. For instance, generator 6 can produce a sinusoidal, square wave or even sawtooth voltage.

The frequency of the electric field generated between electrodes 4 and 5 is chosen depending on the particular application. Frequencies from 50 to 60 Hz have proved suitable in numerous applications.

Satisfactory impregnation is only obtained after fibrous web 2 and powder 3 have been exposed to the alternating electric field for a sufficient time. This depends on the application in question and other process parameters. It can easily be determined experimentally. Generally speaking, this time is longer than one second.

An infrared camera was used to record the maximum temperature at the level of one of electrodes 4 and 5 where the width l of strips 11 and the spacing e between strips 11 were 50 mm and 25 mm respectively. The change in this temperature over time after starting up device 1 and without any cooling is shown graphically by curve $C_1$ in FIG. 3. In this same FIG. 3, curve $C_2$ also graphically represents the change in a maximum temperature measured by an infrared camera at the level of the electrodes, without any cooling of the electrodes. This curve was obtained using continuous electrodes that were comparable to those according to the prior art as mentioned in aforesaid Patent Application WO 99/22920, all other things being equal. More precisely, each of these continuous electrodes on which the maximum temperatures used to plot curve $C_2$ were measured has a rectangular shape with a width approximately equal to the length of one strip 11.

As comparison of curves $C_1$ and $C_2$ clearly shows, discontinuous electrodes 4 and 5 heat up significantly less than the continuous electrodes, all other things being equal. At the same time, it was found that insulating screens 7 associated with electrodes 4 and 5 had a much better ability to withstand ageing than similar insulating screens associated with continuous electrodes. In particular, no breakdown through screens 7 was observed after the device shown in FIG. 1 had been used for several hours. This was not the case after the impregnation device for which the measurements used to plot curve $C_2$ were obtained had been used consecutively for several hours under identical conditions.

The use of discontinuous electrodes 4 and 5 was also found to have other advantages. One of these advantages is more homogeneous impregnation, especially if the electrical conductivity of powder 3 is increased. In particular, concentrations of powder 3 form between the continuous electrodes according to the prior art. These concentrations extend in a direction that is perpendicular to the electrodes and follow the transport motion of the fibrous web. Such powder concentrations did not occur when impregnation was performed using device 1.

More efficient impregnation was also observed when impregnation was produced using electrodes 4 and 5. This improved efficiency is explained by the fact that there are several abrupt field variations in a direction parallel to feed direction F because electrodes 4 and 5 are discontinuous. The improved impregnation efficiency achieved using electrodes 4 and 5 may also be explained by the number of transverse edges that each of electrodes 4 and 5 have. The electric field generated at the edge of an electrode is more intense; this is referred to as the "edge effect". When electrodes 4 and 5 are used, fibrous web 2 and powder 3 are subjected to multiple edge effects as they are transported along passage 8.

Figure 3:
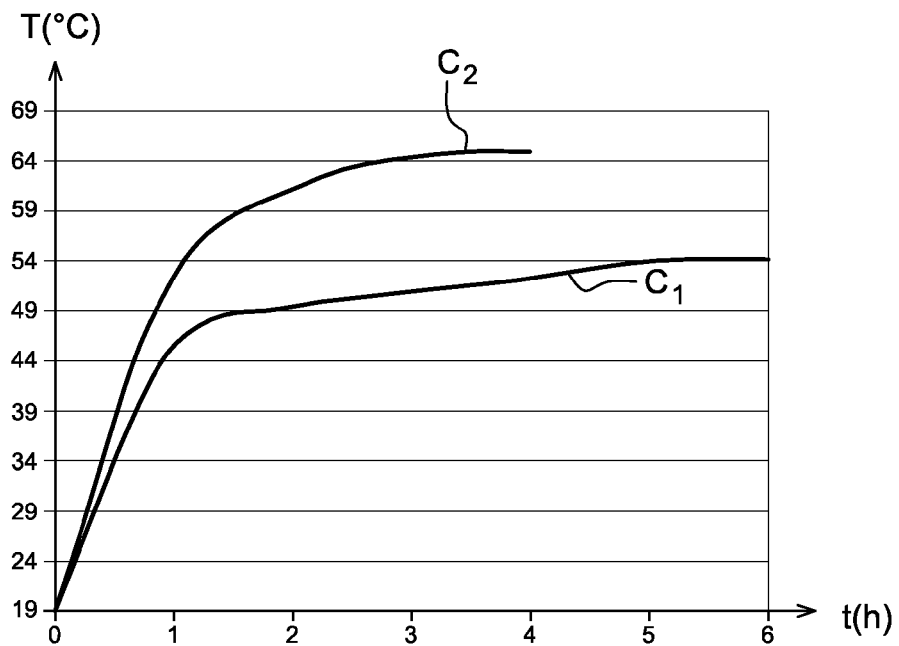
FIG. 3 is a graph that visually plots two maximum changes in temperature as a function of time, namely the maximum change in temperature on an electrode in the device shown in FIG. 1 and the maximum change in temperature on an electrode in an impregnation device according to the prior art.
Figure 4:
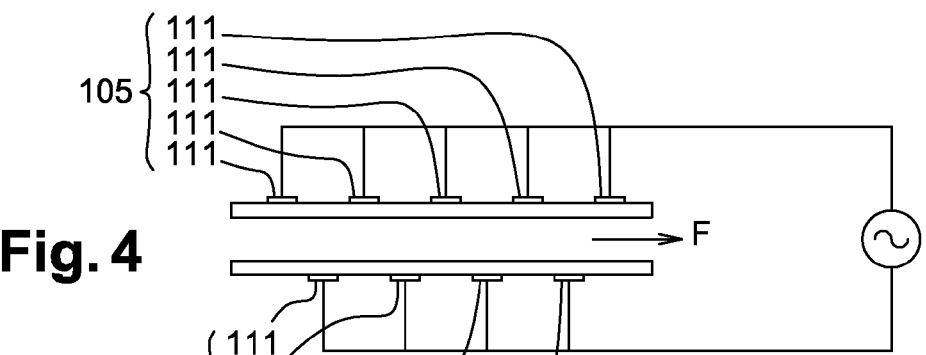
FIG. 4 is a diagram similar to FIG. 1 and shows a pair of opposite-facing subassemblies capable of replacing those in FIG. 2 according to a first variant of an embodiment of the invention.

The invention is not confined to the embodiment shown in FIGS. 1 to 3. In particular, each conducting strip 11 of the lower electrode need not face a conducting strip 11 of upper electrode 5. This is the case, for instance, in FIG. 4 which shows a pair of opposite-facing electrodes 104 and 105 in accordance with a first variant of an embodiment of the invention. These electrodes 104 and 105 are equivalent to electrodes 4 and 5 and can replace them in device 1. Each of them consists of a row of conducting strips 111. The conducting strips 111 of electrode 104 and those of electrode 105 are offset relative to each other parallel to feed direction F so that they are staggered. Obviously, they can also be less offset relative to each other. In addition, one conducting strip of an electrode can partly face a conducting strip of another electrode and partly face a slot that separates two consecutive conducting strips of that other electrode.

Moreover, conducting strips 11 or 111 of one of the electrodes can point in directions that are not parallel to conducting strips 11 or 111 of the other electrode.

Figure 5:
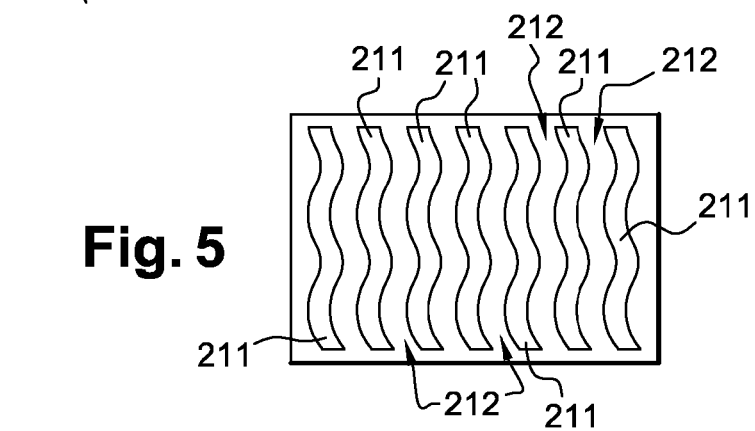
FIG. 5 is a top view of a subassembly, a pair of which is capable of replacing the two subassemblies shown in FIG. 2 according to a second variant of an embodiment of the invention.

The conducting strips of opposite-facing electrodes can also have different shapes. In particular, they need not be straight; this is the case with the conducting strips 211 shown in FIG. 5. These conducting strips 211 form one of the two opposite-facing electrodes of an impregnation device according to a second variant of an embodiment of the invention. They fulfill the same function as conducting strips 11 and 111, but are wavy, like slots 212 which separate them from each other. Each conducting strip 211 has a waviness that can assume shapes other than that shown in FIG. 5 and may, for instance, have a square-wave or sawtooth shape.

Also, conducting strips 11, 111 or 211 of a single impregnation device 1 need not all have the same width l. For example, wide conducting strips 11, 111 or 211 may alternate with narrower conducting strips 11, 111 or 211. Similarly, conducting strips 11, 111 or 211 of one of the two opposite-facing electrodes need not have the same width as conducting strips 11, 111 or 211 of the other electrode of the pair of opposite-facing electrodes. More generally speaking, the conducting strips of the two opposite-facing electrodes need not have the same shape.

Furthermore, at least one of conducting strips 11, 111 or 211 need not have a constant width l. For instance, it may be thinner towards one of its end and have an overall trapezoidal shape.

The invention claimed is:

1. A device for impregnating a porous material with powder, comprising at least a first dielectric screen and first and second opposite-facing electrodes which are separated by a passage for the porous material provided with powder and are capable of producing an alternating electric field in this passage after having been connected to an alternating voltage generator, with the first dielectric screen electrically insulating the first and second electrodes from each other at a level of said passage wherein at least said first electrode comprises at least two conducting strips, each of which has an internal face covered by the first dielectric screen and, overall, turned towards the second electrode, and also a longitudinal edge running along a separating slot, which said strips are separated from each other by this separating slot and are electrically connected to one another.

2. The device as claimed in claim 1, wherein the device is adapted for transporting said porous material through said passage in a feed direction (F) in which there are said at least two conducting strips of said first electrode arranged successively.

3. The device as claimed in claim 1, wherein said first dielectric screen forms a support for said conducting strips of said first electrode.

4. The device as claimed in claim 1, wherein the device comprises a second dielectric screen that electrically insulates said first and second electrodes from each other, with the second electrode comprising at least two second conducting strips, each of which has an internal face covered by the, second dielectric screen and, overall, turned towards the first electrode and also a second longitudinal edge running along a second separating slot, which said at least two second conducting strips are separated from each other by this second separating sot and are electrically connected to one another.

5. The device as claimed in claim 2, wherein the first dielectric screen forms a support for the conducting strips of the first electrode.

6. The device as claimed in claim 3, wherein the device comprises a second dielectric screen that electrically insulates said first and second electrodes from each other, with the second electrode comprising at least two second conducting strips, each of which has a second internal face covered by the second dielectric screen and, overall, turned towards the first electrode and also a longitudinal edge running along a second separating slot, which said at least two second conducting strips are separated from each other by this second separating slot and are electrically connected to one another.

7. The device as claimed in claim 1, wherein the device is adapted to transport the porous material in a feed direction, wherein a conducting strip of said at least two conducting strips extends in a direction generally transverse to the feed direction.

8. The device as claimed in claim 1, wherein the device is adapted to transport the porous material in a feed direction, wherein each conducting strip of said at least two conducting strips extends in a direction generally transverse to the feed direction.

9. The device as claimed in claim 1, wherein said at least two conducting strips includes a first row of conducting strips and wherein the second electrode includes a second row of conducting strips, the first row of conducting strips and the second row of conducting strips being offset from one another.

10. The device as claimed in claim 1, wherein said second electrode includes a conducting strip that faces said separating slot.

11. The device as claimed in claim 1, wherein said second electrode includes a conducting strip that partially faces said separating slot.

12. The device as claimed in claim 1, wherein said second electrode includes a conducting strip that entirely faces said separating slot.

13. The device as claimed in claim 1, wherein said device includes a feed direction and wherein the device produces changes of the electric field in a direction parallel to the feed direction.

14. The device as claimed in claim 1, wherein the device is adapted to transport the porous material in a feed direction, wherein a conducting strip of said at least two conducting strips extends in a direction that is not parallel to the feed direction, wherein said second electrode includes at least two second conducting strips, wherein a second conducting strip of said at least two second conducting strips extends in a direction that is not parallel to the feed direction.

15. The device as claimed in claim 1, wherein the device is adapted to transport the porous material in a feed direction, wherein a conducting strip of said at least two conducting strips extends a width of said passage in a direction that is not parallel to the feed direction.

16. The device as claimed in claim 1, wherein the device is adapted to transport the porous material in a feed direction, wherein a conducting strip of said at least two conducting strips extends a width of said first dielectric screen in a direction that is not parallel to the feed direction.

17. The device as claimed in claim 1, wherein said alternating voltage generator outputs a voltage having a wave shape selected from the group consisting of sinusoidal, square wave, and sawtooth.

* * * * *

UNITED STATES PATENT AND TRADEMARK OFFICE
CERTIFICATE OF CORRECTION

| | | |
|---|---|---|
| PATENT NO. | : 8,967,079 B2 | Page 1 of 1 |
| APPLICATION NO. | : 13/002244 | |
| DATED | : March 3, 2015 | |
| INVENTOR(S) | : Joric Marduel | |

It is certified that error appears in the above-identified patent and that said Letters Patent is hereby corrected as shown below:

In the Claims

Column 7, Line 23: Claim 4, Delete "sot" and insert --slot--

Signed and Sealed this
Twenty-first Day of July, 2015

Michelle K. Lee
*Director of the United States Patent and Trademark Office*